(12) United States Patent
Lari et al.

(10) Patent No.: US 7,779,417 B2
(45) Date of Patent: Aug. 17, 2010

(54) METHOD AND APPARATUS FOR MAKING INTER-PROCESS PROCEDURE CALLS THROUGH SHARED MEMORY

(75) Inventors: Mohammad Shoaib Lari, Palo Alto, CA (US); Srinath Krishnaswamy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1331 days.

(21) Appl. No.: 11/259,240

(22) Filed: Oct. 25, 2005

(65) Prior Publication Data
US 2007/0094674 A1 Apr. 26, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................. 719/312
(58) Field of Classification Search ................ 719/312
See application file for complete search history.

(56) References Cited

U.S. PATENT DOCUMENTS 5,566,302 A * 10/1996 Khalidi et al. ............. 719/312
5,787,281 A * 7/1998 Schreiber et al. ........... 719/328
6,125,401 A * 9/2000 Huras et al. ................ 719/310
6,687,702 B2 * 2/2004 Vaitheeswaran et al. ...... 707/10

OTHER PUBLICATIONS

IBM, "Client/Server Intra-Operability between Disk Operating System Boxes", Feb. 1, 1994, IBM Technical Disclosure Bulletin, vol. 37, Iss. 2B, pp. 107-108.*

* cited by examiner

*Primary Examiner*—Hyung S Sough
*Assistant Examiner*—KimbleAnn Verdi
(74) *Attorney, Agent, or Firm*—Park, Vaughan & Fleming LLP

(57) ABSTRACT

One embodiment of the present invention provides a system that facilitates making an inter-process procedure call through a shared memory that is shared between a client process and a server process, wherein the client makes the inter-process procedure call as if the client is making a local procedure call, but the procedure call actually executes on the server. The system operates by providing an Application Programming Interface (API) to allow the client to make an inter-process procedure call. The system then allocates a section of the shared memory for the data structure parameters of the inter-process procedure call.

15 Claims, 6 Drawing Sheets

METHOD AND APPARATUS FOR MAKING INTER-PROCESS PROCEDURE CALLS THROUGH SHARED MEMORY

BACKGROUND

1. Field of the Invention

The present invention relates to enterprise computer applications. More specifically, the present invention relates to a method and an apparatus for making inter-process procedure calls through shared memory.

2. Related Art

Organizations typically arrange enterprise applications into multiple tiers to facilitate scalability, increased performance, and security. Traditionally, each tier is physically located on a different server or cluster of servers. For example, it is common to host the web server/user-interface tier on one server, the business logic on a second server, and the database server on a third server. In the example illustrated in FIG. 1, browsers 108-112 are coupled to application 102 via network 106. Application 102 runs on a server and is coupled to database server 114, which runs on a different server than application 102. As illustrated in FIG. 1, when application 102 wants to execute a procedure call on database server 114, it does so by making a remote procedure call via Oracle Call Interface™ (OCI) 104.

However, the multiple tier architecture gives rise to new problems. Network bandwidth is relatively expensive, and increased usage of the enterprise application results in increased network bandwidth consumption. Performance can also suffer, because it takes time for the tiers to communicate with each other.

In some instances, to increase performance, the various tiers can be placed on the same server. However, for security reasons, the different tiers still run in separate processes on the server. In order for one process to communicate with another process, elaborate protocols are needed, because no generalized mechanism exists for inter-process procedure calls.

Hence, what is needed is a method and an apparatus for making inter-process procedure calls without the limitations listed above.

SUMMARY

One embodiment of the present invention provides a system that facilitates making an inter-process procedure call through a shared memory that is shared between a client process and a server process, wherein the client makes the inter-process procedure call as if the client is making a local procedure call, but the procedure call actually executes on the server. The system operates by receiving a request from the client through an Application Programming Interface (API) to make an inter-process procedure call. The system then allocates a section of the shared memory for the data structure parameters of the inter-process procedure call. Additionally, the client process acquires a lock on a commonly known section of shared memory called a Parameter Control Block. Once the lock is acquired, the client process stores parameters for the inter-process procedure call in the Parameter Control Block. Finally, the client process clears a Call_Done flag and releases the lock.

In a variation on this embodiment, the server process acquires the lock. Once the lock is acquired, the server process processes the inter-process procedure call using the parameters from the Parameter Control Block and data structure parameters in the shared memory. The server process then stores results of the inter-process procedure call in the shared memory. In addition, the server process sets a Call_Done flag to indicate that the server process has completed processing the inter-process procedure call. Finally, the server process releases the lock.

In a variation on this embodiment, the client process acquires the lock. Upon acquiring the lock, the client process determines if the Call_Done flag is set. If so, the client process processes the results of the inter-process procedure call from the section of shared memory at the client.

In a further variation, the request to make an inter process procedure call is made by a thread executing on the client, wherein the client is operating in a multi threaded environment.

In another variation, the results of the inter process procedure call are consumed by a different client thread than the one that issued the call.

In a further variation, the server process can service calls from multiple client processes by waiting on locks on more than one parameter control blocks.

In another variation, the server process can have multiple threads, each serving one or more client processes.

In a variation on this embodiment, the server is a database server.

In a variation on this embodiment, the client is an enterprise application running on a middle tier in a multi-tier application environment.

In a further variation, the inter-process procedure call is triggered by a request from a browser coupled to the enterprise application.

In a variation on this embodiment, the lock is a semaphore.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Utilizing Inter-Process Procedure Calls

Figure 1:
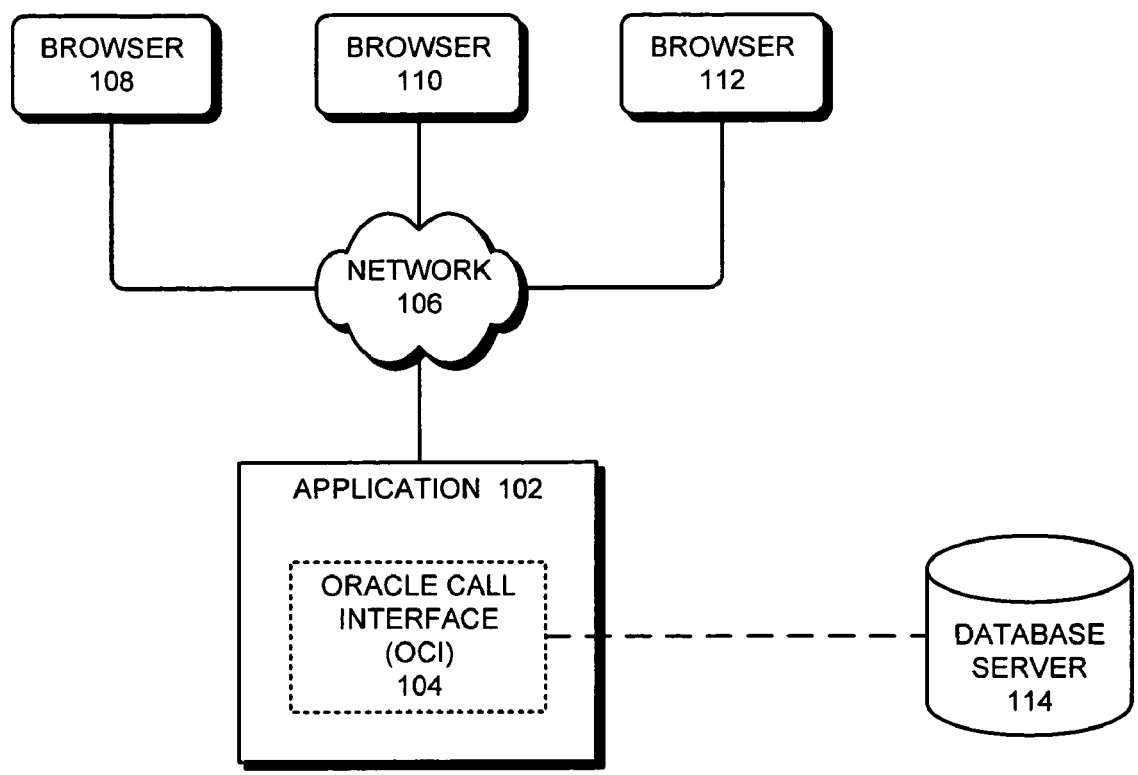
FIG. 1 illustrates a multi-tier computer application.
Figure 2:
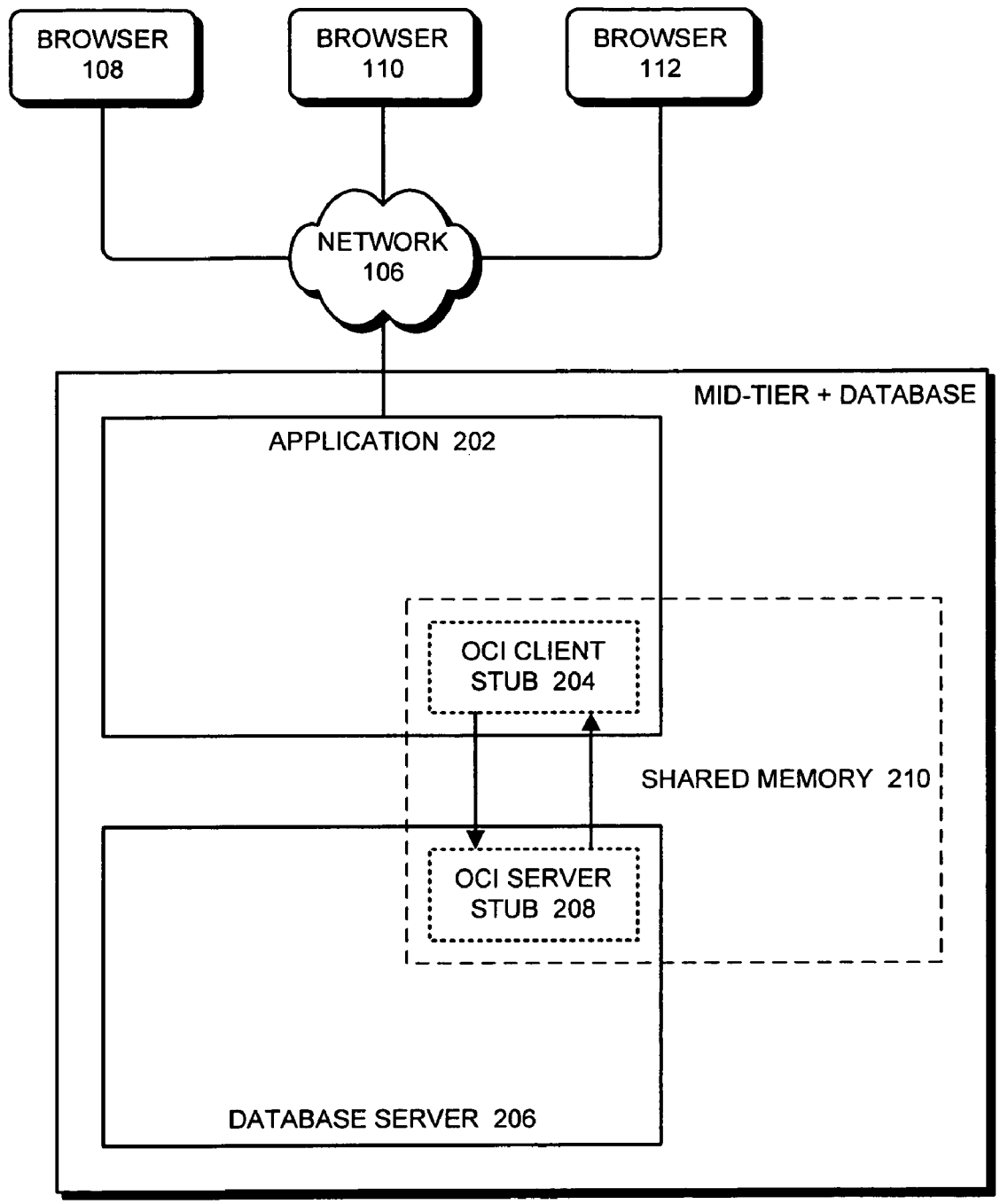
FIG. 2 illustrates an application utilizing inter-process procedure calls in accordance with an embodiment of the present invention.

FIG. 2 illustrates an application 202 utilizing inter-process procedure calls in accordance with an embodiment of the present invention. Application 202 and database server 206 are located on one tier of multi-tier environment. Application 202 is coupled to browsers 108-112 via network 106. Note that browsers 108-112 can generally include any type of web browser capable of viewing a web site, such as the INTERNET EXPLORERT™ browser distributed by the Microsoft Corporation of Redmond, Wash. Also note that network 106 can generally include any type of wired or wireless communication channel capable of coupling together computing nodes. This includes, but is not limited to, a local area network, a wide area network, or a combination of networks. In one embodiment of the present invention, network 106 includes the Internet.

In the embodiment illustrated in FIG. 2, application 202 and database server 206 are separate operating system processes running on the same server. Application 202 and database server 206 both have access to shared memory 210. Application 202 includes Oracle Call Interface (OCI) client stub 204. Likewise, database server 206 includes OCI server stub 208. In the embodiment of the present invention illustrated in FIG. 2, OCI client stub 204 and OCI server stub 208 allow application 202 to make inter-process procedure calls on database server 206 via shared memory 210 as if application 202 was making a local procedure call. These inter-process procedure calls are accomplished by OCI client stub 204 and OCI server stub 208 via an Application Programming Interface (API). This is described in more detail below in FIGS. 4-6.

Control Block

Figure 3:
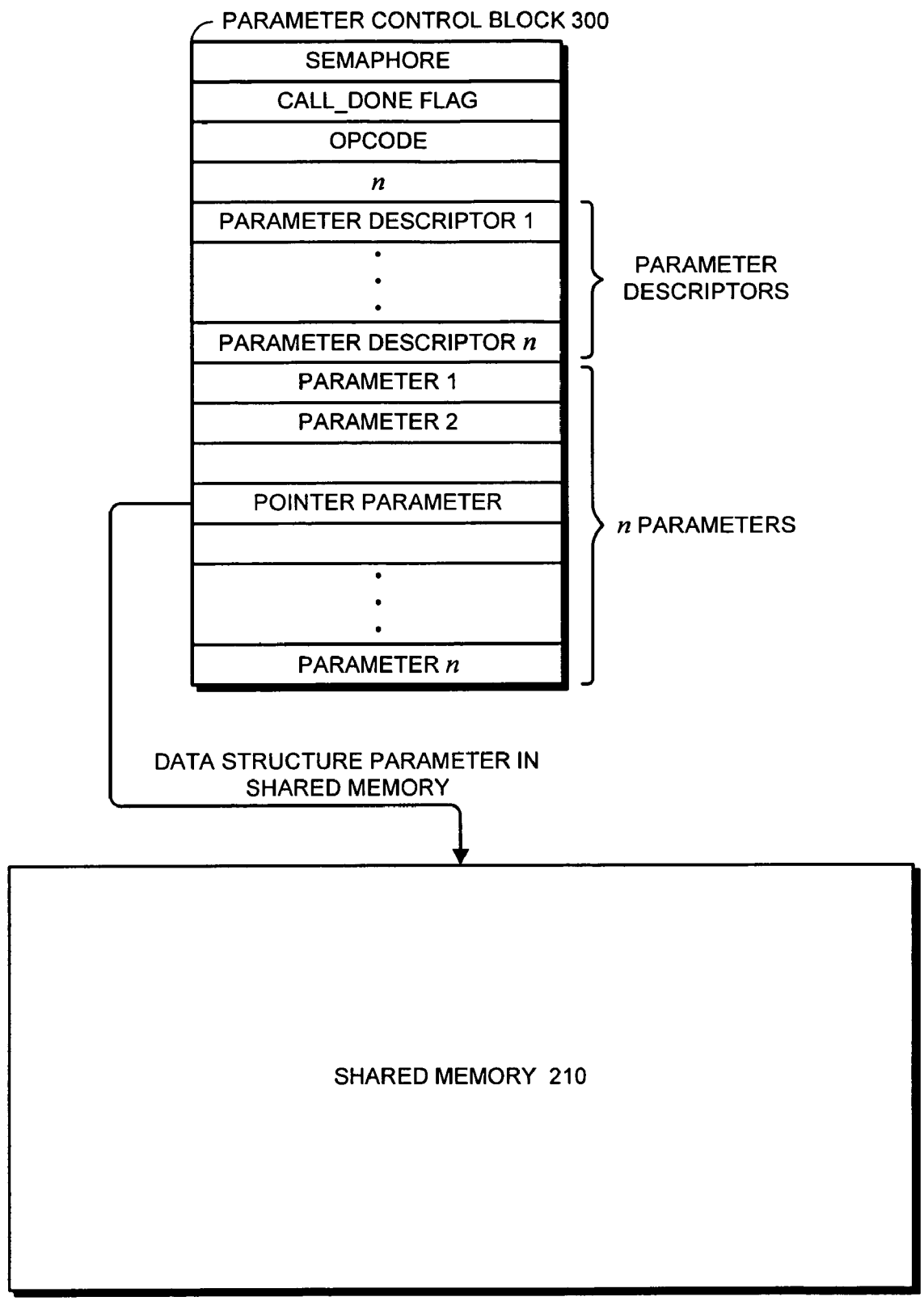
FIG. 3 illustrates a control block in accordance with an embodiment of the present invention.

FIG. 3 illustrates a parameter control block 300 in accordance with an embodiment of the present invention. Note that any manner of keeping track of the inter-process procedure call within shared memory 210 may be used, and is not limited to the use of the parameter control block 300 illustrated in FIG. 3.

Parameter control block 300 is a data structure in shared memory 210 for keeping track of an inter-process procedure call. Parameter control block 300 comprises a lock, a Call_Done flag to indicate the processing status of the inter-process procedure call, a count of the number of arguments for the inter-process procedure call, an array of Parameter Descriptors and an array of arguments for the inter-process procedure call. Note that in the parameter control block 300 illustrated in FIG. 3, the lock is a semaphore. The present invention is not meant to be limited to the use of semaphores, and any type of locking mechanism may be used.

In one embodiment of the present invention, the operation to be performed by the inter-process call is indicated by an Operation Code (OPCODE) in the parameter control block. This is a mutually agreed operation code for the procedure call to be performed. In this embodiment, the number parameter, n, is still passed in the parameter control block. Corresponding to the number of parameters, there are n parameter descriptors and parameters. A parameter descriptor describes the data type of the argument (parameter) of the call, such as integer, floating point, text string, or pointer to a data structure parameter allocated in the shared memory. The parameters to the call are either arguments for the call, or they are pointers to data structures in the shared memory.

In one embodiment of the invention, the process of setting up of parameter control block can be automated by a translator that will generate parameter control blocks based on the prototype (function declaration) of the local procedure calls.

Making an Inter-Process Procedure Call

Figure 4:
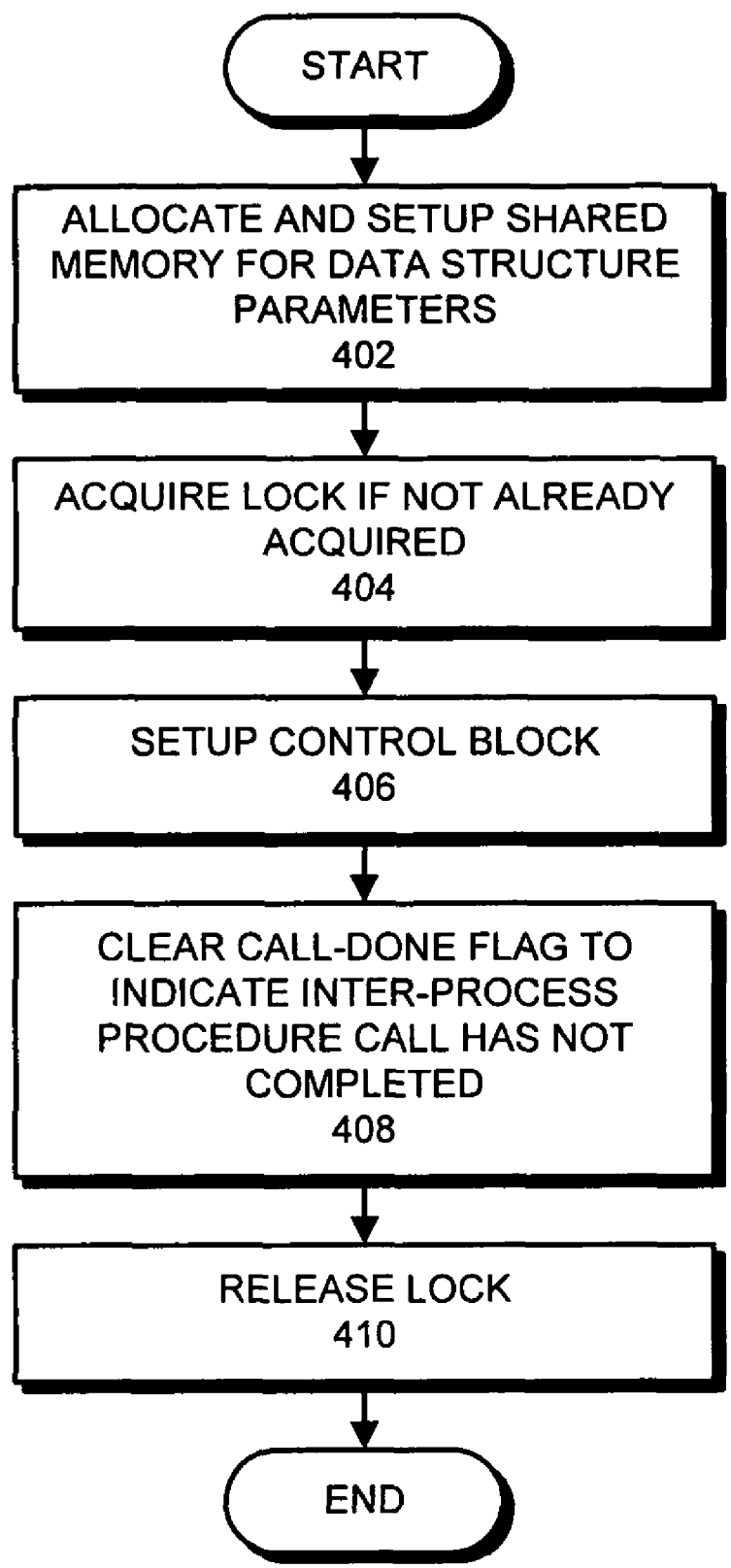
FIG. 4 presents a flowchart illustrating the process of making an inter-process procedure call in accordance with an embodiment of the present invention.

FIG. 4 presents a flowchart illustrating the process of making an inter-process procedure call in accordance with an embodiment of the present invention. The system starts when application 202 initiates an inter-process procedure call at Oracle Call Interface (OCI) client stub 204. The system first initializes the parameter control block and the lock such that the client process has possession of the lock initially. The client process then sets up memory data for data structure parameters in shared memory 210 (step 402). Next, the client process acquires the lock in the parameter control block if it did not already have it (step 404). Note that in one embodiment of the present invention, the lock is a semaphore. The client process sets up the parameter control block 300 with the call OPCODE, the number of parameters, the array of parameter descriptors, and the array of parameters (step 406). The client process then clears the Call_Done flag to indicate that the inter-process procedure call has not been completed (step 408). Finally, the client process releases the lock (step 410).

Executing an Inter-Process Procedure Call

Figure 5:
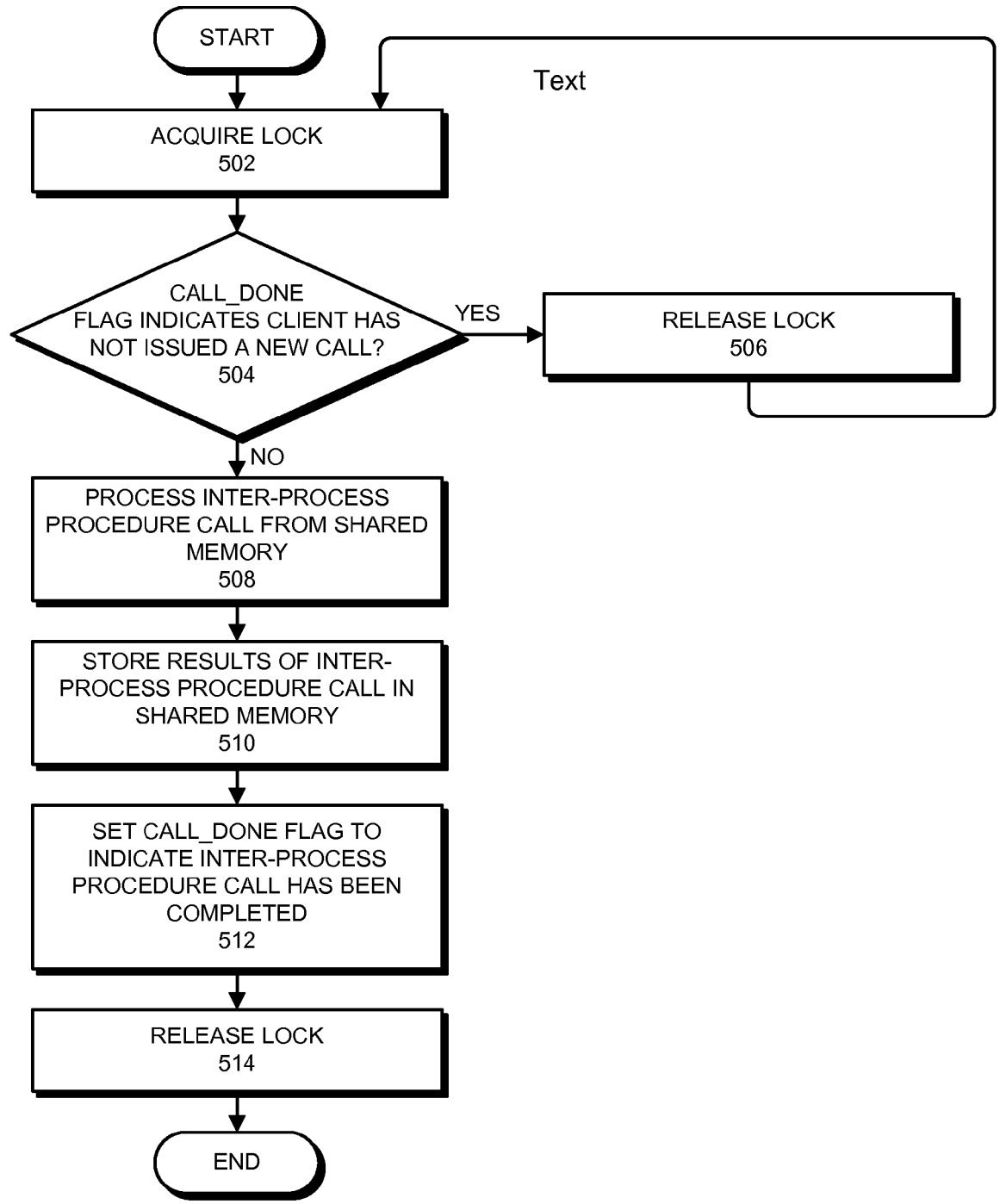
FIG. 5 presents a flowchart illustrating the process of executing an inter-process procedure call in accordance with an embodiment of the present invention.

FIG. 5 presents a flowchart illustrating the process of executing an inter-process procedure call in accordance with an embodiment of the present invention. The server process starts by acquiring the lock at OCI server stub 208 (step 502). Next, the server process checks to see if the Call_Done flag is clear (step 504), and if so, processes the inter-process procedure call from shared memory 210 (step 508). The server process then stores the results of the inter-process procedure call back into shared memory 210 (step 510). Next, the server process sets the Call_Done flag to indicate the inter-process procedure call has been completed (step 512). Finally, the server process releases the lock (step 514).

Note that the checking of the Call_Done flag by the server process (step 504) after acquiring the lock is to prevent the race condition where the server process re-acquires the lock before the client process had the time to process the results of the inter process procedure call. That is, after acquiring the lock (step 502), if the server process finds that the Call_Done flag is still set (step 504), then the server process releases the lock (step 506) and tries to re-acquire the lock again (step 502). An optional delay can be introduced between the time the server releases the lock (step 504) and re-acquires the lock (step 502) to give the client process time to acquire the lock (step 502).

Processing the Results of an Inter-Process Procedure Call

Figure 6:
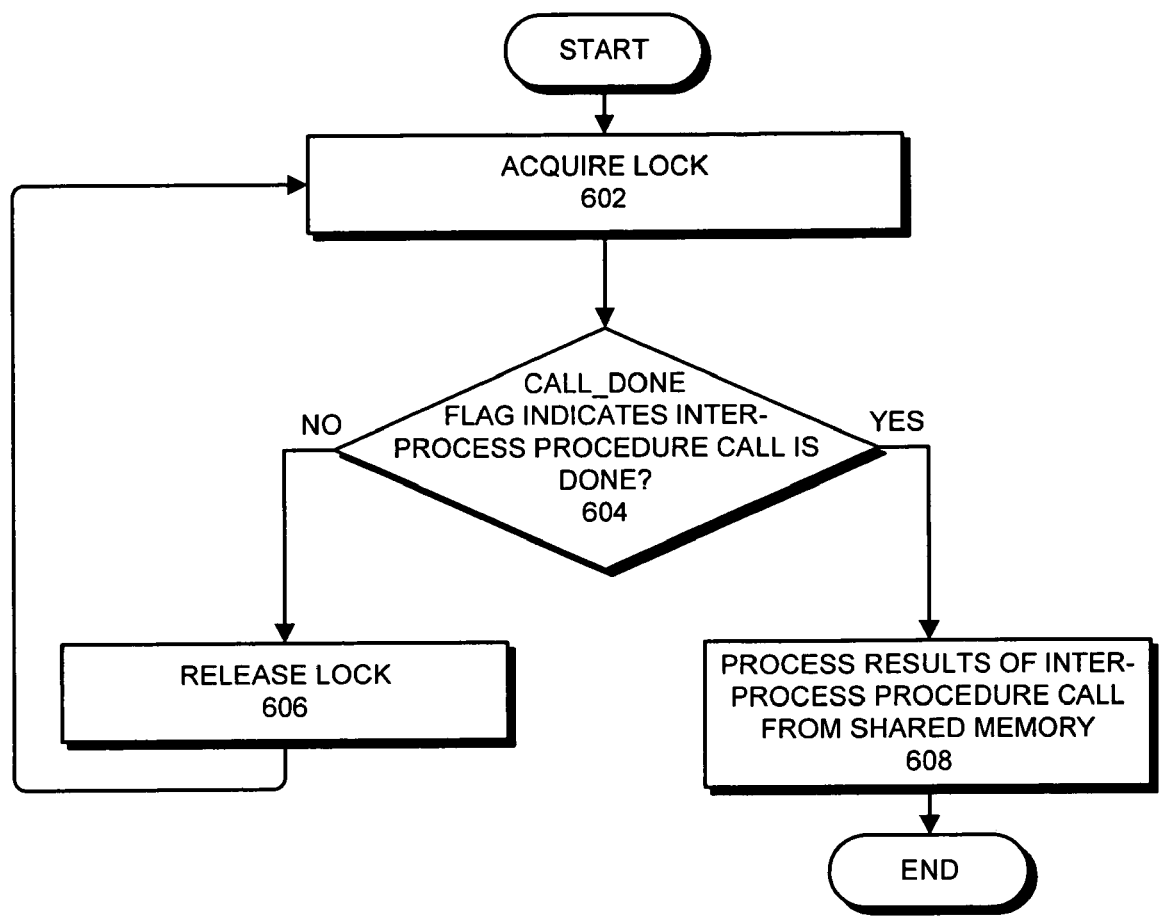
FIG. 6 presents a flowchart illustrating the process of processing the results of an inter-process procedure call in accordance with an embodiment of the present invention.

FIG. 6 presents a flowchart illustrating the process of processing the results of an inter-process procedure call in accordance with an embodiment of the present invention. After making the inter process procedure call, the client process starts by acquiring the lock at OCI client stub 204 (step 602). The client process then determines if the Call_Done flag indicates that the inter-process procedure call has been completed by server process 206 (step 604). If not, the client process releases the lock (step 606) and optionally waits before trying to acquire the lock again (step 602). Note that steps 602-606 are repeated until OCI client stub 204 acquires the lock with the Call_Done flag set to indicate the completed call. Also note that this acquiring of the lock, checking of Call_Done flag, and releasing of the lock is analogous to steps 502-506 of the server process to avoid race condition. That is, after setting up the parameter control block, clearing the Call_Done flag, and releasing the lock, the client process can acquire the lock again (step 602) before the server process had a chance to acquire the lock (step 502). In this case, the Call_Done flag indicates to the client process that the inter process call is not done, and the client should retry.

Once the client process acquires the lock at OCI client stub 204 with the Call_Done flag set, the system then processes the results of the inter-process procedure call from shared memory 210 (step 608).

The client process normally holds on to the lock as the client process is either preparing parameters for the call or processing the results of the call. Only during the time the server process is executing the inter process procedure call, the server process has the possession of the lock. Therefore, the client process does not release the lock after the completion of the call. Arguments for a new inter process procedure call can be set by the client process in the parameter call, and lock is only released when the client process is ready to issue the next call as described in FIG. 4.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
providing an Application Programming Interface (API) to allow a client to use a client stub to make an inter-process procedure call via the API to a server stub on a server, wherein the client makes the inter-process procedure call as if the client were making a local procedure call via the API, and wherein the inter-process procedure call is made through a shared memory that is allocated for the client at the server;
receiving a request, from the client stub through the API to the server stub at the server, to make an inter-process procedure call;
allocating, at the server, a section of the shared memory for the inter-process procedure call;
acquiring a lock on the section of shared memory;
processing the inter-process procedure call at the server, which comprises:
retrieving parameters from the section of shared memory for the inter-process procedure call that are stored in the section of shared memory by the client, and storing results of the inter-process procedure call in the section of shared memory;
setting a flag to indicate that the server has completed processing the inter-process procedure call; and
releasing the lock, wherein the lock is acquired by the client that processes the results of the inter-process procedure call from the section of shared memory in response to acquiring the lock and determining that the flag is set.

2. The method of claim 1, wherein the request to make an inter-process procedure call is made by a thread executing on the client, wherein the client is operating in a multi-threaded environment.

3. The method of claim 1, wherein the server services calls from multiple clients by waiting on locks on more than one section of shared memory.

4. The method of claim 1, wherein the server comprises multiple threads, and wherein each thread serves one or more clients.

5. The method of claim 1, further comprising automatically generating code stubs for issuing and processing inter-process procedure calls based on prototypes of the inter-process procedure call.

6. The method of claim 1, wherein the server is a database server.

7. The method of claim 1, wherein the client is an enterprise application running on a middle tier in a multi-tier application environment.

8. The method of claim 7, wherein the inter-process procedure call is triggered by a request from a browser coupled to the enterprise application.

9. The method of claim 1, wherein the lock is a semaphore.

10. A non-transitory computer-readable storage medium storing instructions that when executed by a computer cause the computer to perform a method, the method comprising:
providing an Application Program Interface (API) to allow a client to use a client stub to make an inter-process procedure call via the API to a server stub on a server, wherein the client makes the inter-process procedure call as if the client were making a local procedure call via the API, and wherein the inter-process procedure call is made through a shared memory that is allocated for the client at the server;
receiving a request, from the client stub through the API to the server stub at the server, to make an inter-process procedure call;
allocating, at the server, a section of the shared memory for the inter-process procedure call;
acquiring a lock on the section of shared memory;
processing the inter-process procedure call at the server, which comprises:
retrieving parameters from the section of shared memory for the inter-process procedure call that are stored in the section of shared memory by the client, and storing results of the inter-process procedure call in the section of shared memory;
setting a flag to indicate that the server has completed processing the inter-process procedure call; and
releasing the lock, wherein the lock is acquired by the client that processes the results of the inter-process procedure call from the section of shared memory in response to acquiring the lock and determining that the flag is set.

11. The non-transitory computer-readable storage medium of claim 10, wherein the request to make an inter-process procedure call is made by a thread executing on the client, wherein the client is operating in a multi-threaded environment.

12. The non-transitory computer-readable storage medium of claim 10, wherein the server is a database server.

13. The non-transitory computer-readable storage medium of claim 10, wherein the client is an enterprise application running on a middle tier in a multi-tier application environment.

14. The non-transitory computer-readable storage medium of claim 13, wherein the inter-process procedure call is triggered by a request from a browser coupled to the enterprise application.

15. An apparatus comprising:
a processor;

an Application Programming Interface (API) configured to allow a client to use a client stub to make an inter-process procedure call via the API to a server stub on a server, wherein the client makes the inter-process procedure call as if the client were making a local procedure call via the API, and wherein the inter-process procedure call is made through a shared memory that is allocated for the client at the server;

a receiving mechanism coupled to the processor and configured to receive a request, from the client stub through the API to the server stub at the server, to make an inter-process procedure call;

an allocation mechanism, at the server, configured to allocate a section of the shared memory for the inter-process procedure call;

a lock-acquiring mechanism configured to acquire a lock on the section of shared memory;

a processing mechanism configured to process the inter-process procedure call on the server, which comprises:
retrieving parameters from the section of shared memory for the inter-process procedure call that are stored in the section of shared memory by the client, and storing results of the inter-process procedure call in the section of shared memory;

a flagging mechanism configured to set a flag to indicate that the server has completed processing the inter-process procedure call; and a lock-releasing mechanism configured to release the lock, wherein the lock is acquired by the client that processes the results of the inter-process procedure call from the section of shared memory in response to acquiring the lock and determining that the flag is set.

* * * * *